J. MULLER.
Bridles for Horses.
No. 145,892.
Patented Dec. 23, 1873.
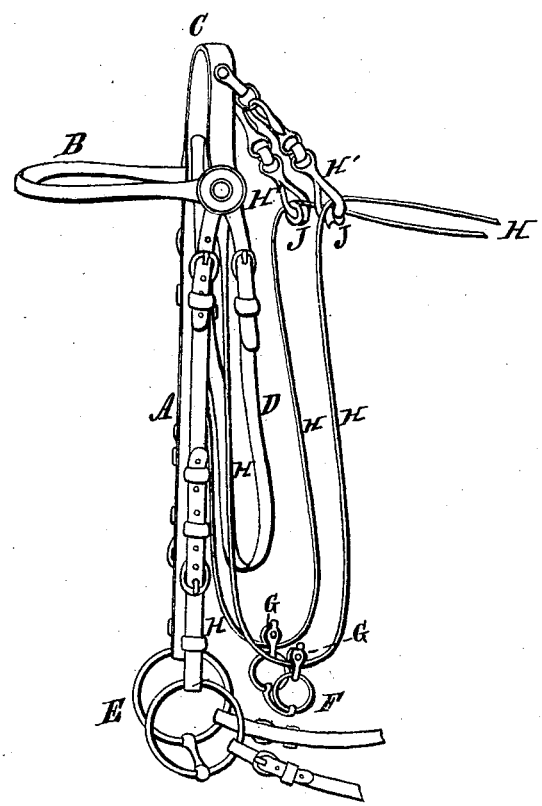
Witnesses
N. E. Lehman
A. P. Grant.
Inventor
John Muller,
By John A. Dudershaim
Att'ys.

UNITED STATES PATENT OFFICE.

JOHN MULLER, OF PHILADELPHIA, PENNSYLVANIA.

IMPROVEMENT IN BRIDLES FOR HORSES.

Specification forming part of Letters Patent No. 145,892, dated December 23, 1873; application filed September 25, 1873.

*To all whom it may concern:*

Be it known that I, JOHN MULLER, of the city and county of Philadelphia and the State of Pennsylvania, have invented a new and useful Improvement in Reins; and I do hereby declare the following to be a clear and exact description of the nature thereof, sufficient to enable others skilled in the art to which my invention appertains to fully understand, make, and use the same, reference being had to the accompanying drawing making part of this specification, in which the figure is a perspective view of the device embodying my invention.

This invention relates to a rein which relieves the animal, or imparts ease and facility to its motions; and consists in the rein, an auxiliary bit suspended therefrom, and provided with rollers over which the rein works, and elevated loops likewise having rollers and directing the rein from the auxiliary bit to the terret or saddle.

Referring to the drawing, A represents the shank-strap; B, the brow-band; C, the crown-band; D, the throat-latch; and E, the driving-bit; all of which may be of well-known form and construction. F represents an auxiliary or reining bit, which is preferably of the order known as "Bradoon." G represents rollers or pulleys, which are mounted on ears projecting from what may be termed the upper side of the rings of the bit F, and between the ears bearing against the pulleys pass the two lines of the reining-line H. The bit F is thus suspended by the rein H, the forward or upper ends of which are attached to the sides of the shank-strap or crown-band, and, after passing down therefrom and around the pulleys G, extend upward and through loops H', bearing against rollers J in said loops H, after which the rein reaches to the terret or saddle, as usually. These loops are suspended from the sides of the crown-band C, and freely jointed thereto.

It will be seen that the rollers G form bearings for the rein H between the beginning of the rein and the loops H', and the latter form bearings for the rein between the bit F and the terret or saddle.

The operation is as follows: The bit F will be placed in the mouth of the horse in common with the driving-bit E, and the lines H adjusted relatively to the amount of reining required.

When the animal elevates or lowers its head the bit F follows the movements thereof, so that the rollers G of the bit run freely on adjacent portions of the rein, and whatever motion is thus imparted to the portion of the rein in the loops H' will cause said portion to run freely on the rollers J of the loops, the latter, owing to its jointed connection with the band C, swinging or conforming to the variations of the rein in the bends thereof in the loops H'.

It will be perceived that the rein has movable bearings, or what might be termed movable axes, at points between beginning and end, so that any strain or drawing on the rein is eased by said bearings or axes, due to the action of the rollers G of the bit F, and rollers J of the loops H', which rollers simply change position on the rein with the movements of the animal, and increase and decrease the amount of the "looping" of the rein without correspondingly increasing the strain or draw on the bit, and thus the mouth of the animal on the shank-strap or brow-band, and thus the head of the animal, and on the terret or saddle and crupper, and thus the back and tail of the animal.

At all times the motions of the animal's head may be made with ease and facility, there being no binding or catching, and the animal cannot be a side-reiner.

The driving-bit being independent of the auxiliary bit, there is no interference in the functions of one with the other, and in cases of falls or stumbling, the animal will be relieved from the severe jerks or strains on the rein otherwise incident to such occasions.

By the use of the rein H "high" reining may be performed; but, even in such a case, while the stylishness or ornamentability of the horse is obtained, there will be material relief afforded the animal.

The rein H may be used with and adjusted to various kinds of bridles.

Having thus described my invention, what I claim as new, and desire to secure by Letters Patent, is—

The combination, with the driving-bit E, of the auxiliary bit F, carrying rollers G and suspended from the relief-rein H, passing from the top of the head gear, and the elevated loops H' carrying the rollers J and directing the rein to the terret or saddle, as herein set forth, and for the purpose described.

JOHN MULLER.

Witnesses:
JOHN A. WIEDERSHEIM,
JNO. A. BELL.